E. FULLER.
MACHINE FOR COATING CAKES.
APPLICATION FILED JULY 15, 1910.
996,479.
Patented June 27, 1911.
5 SHEETS—SHEET 3.
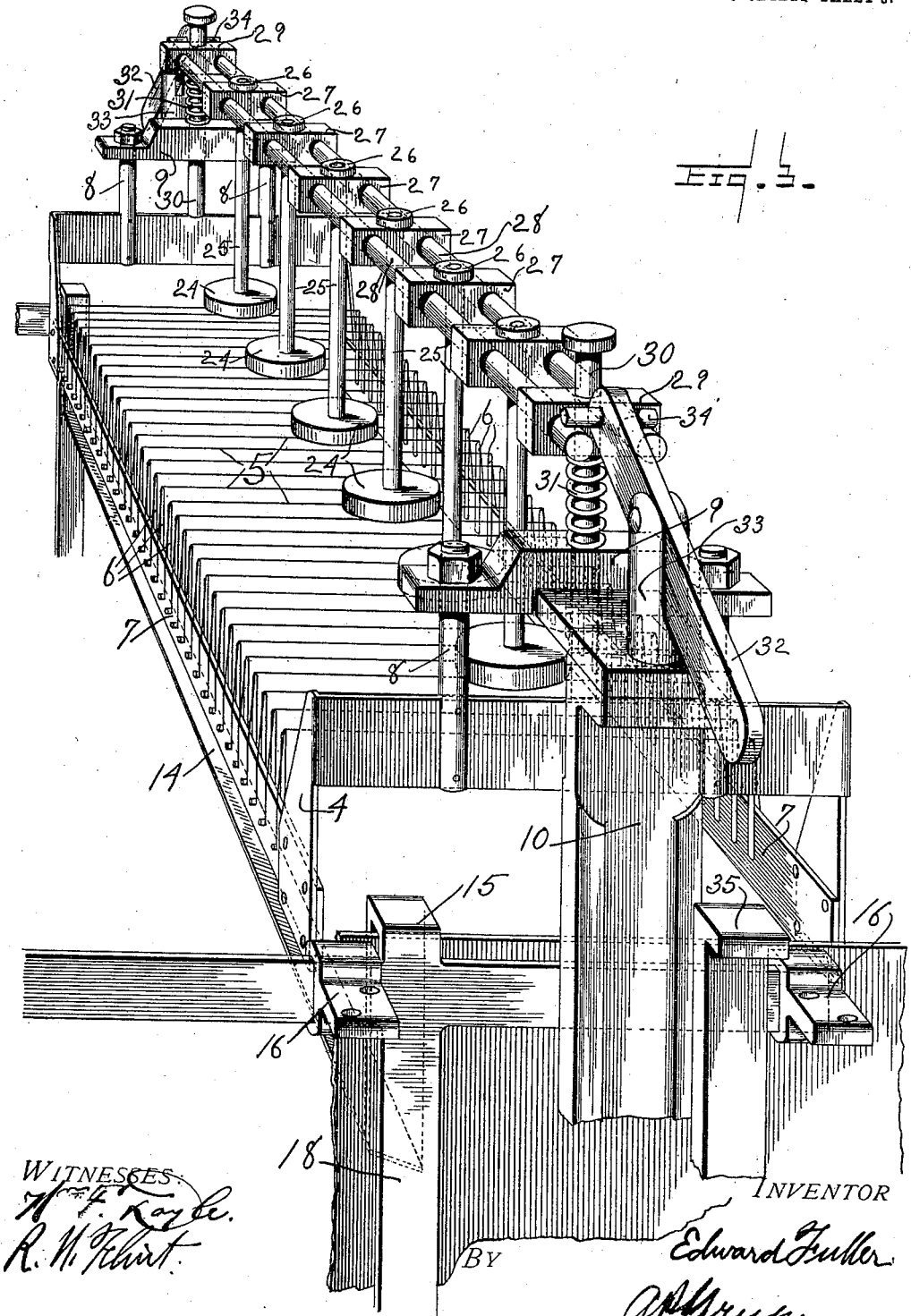

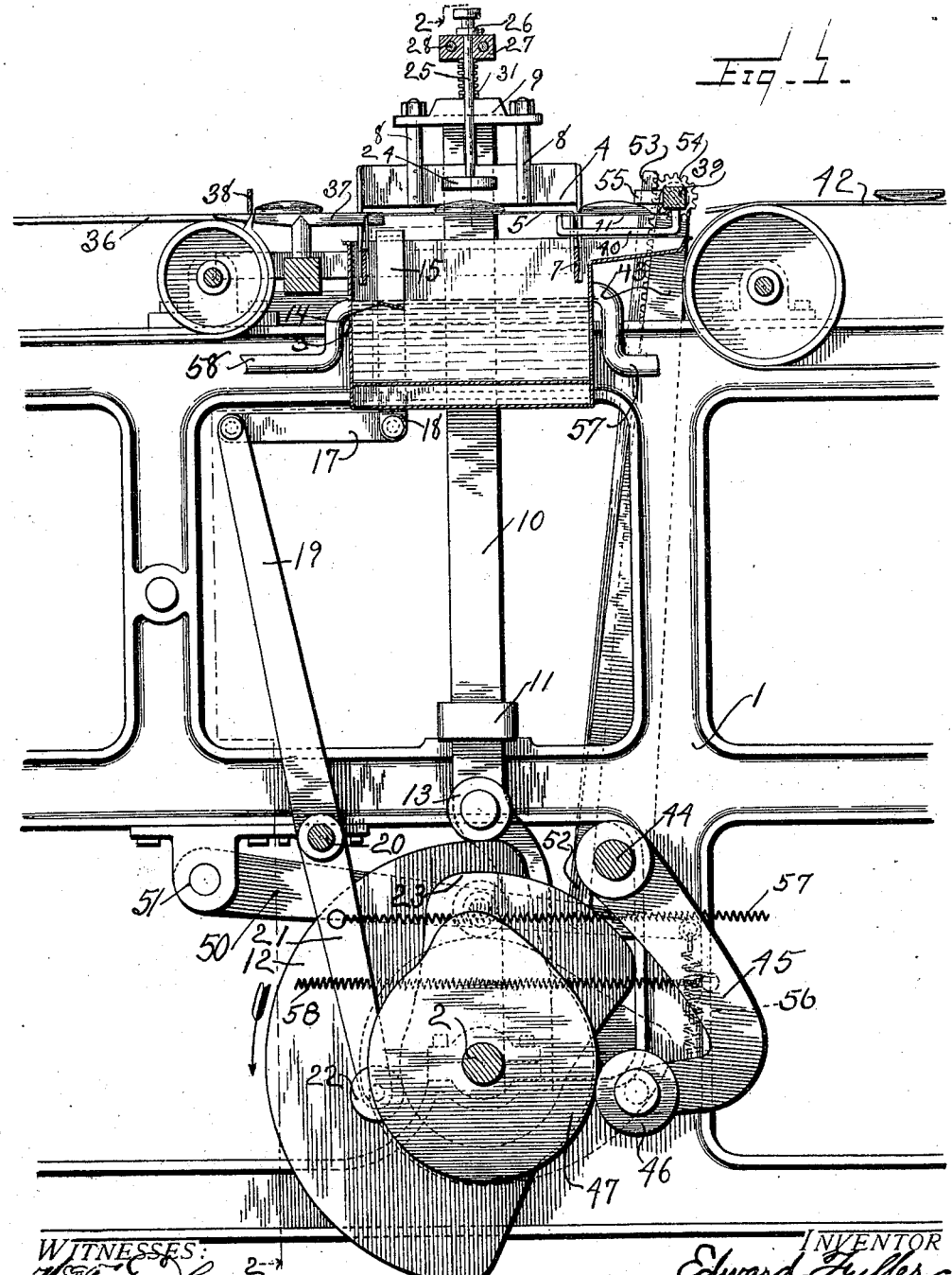

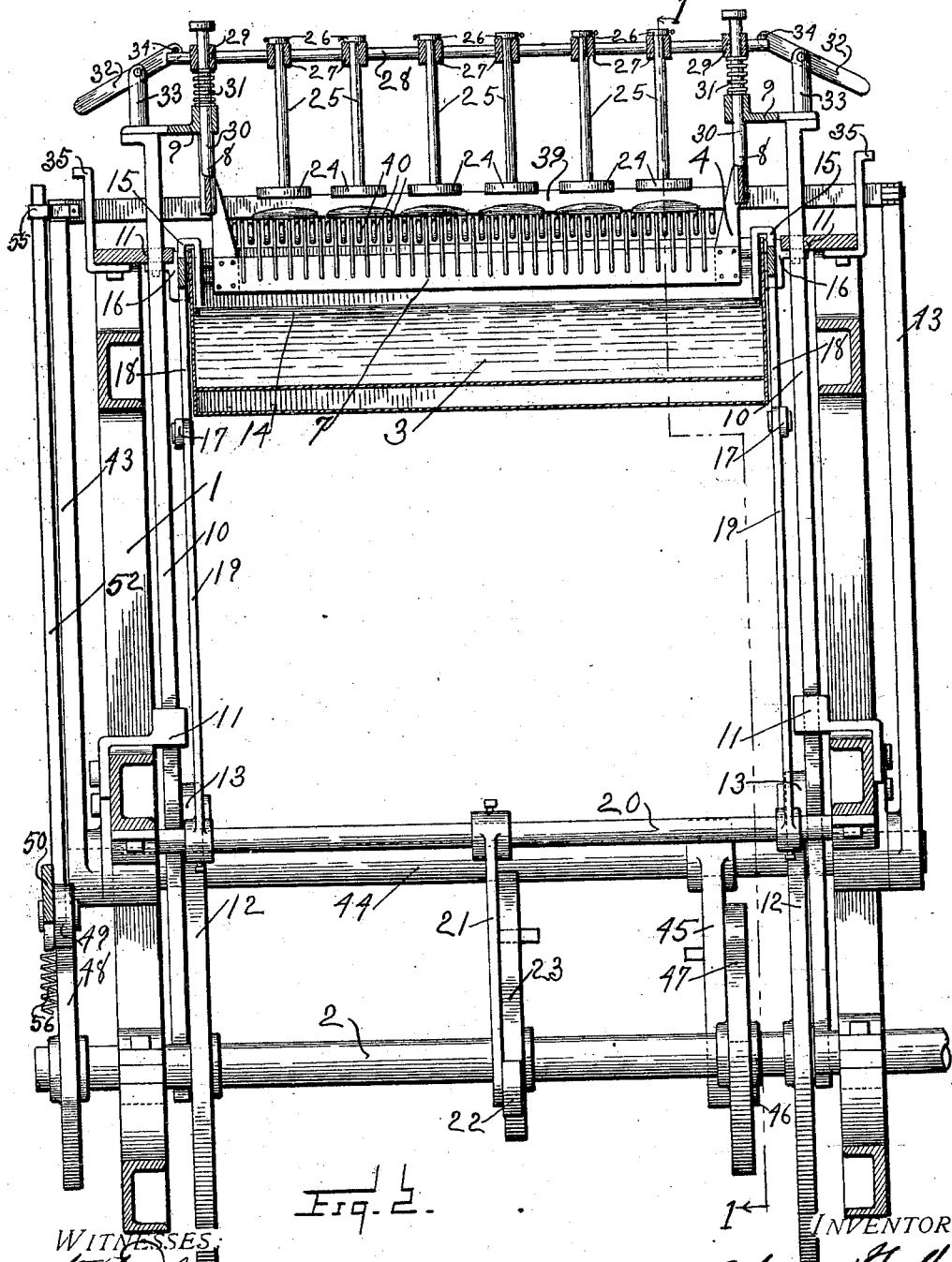

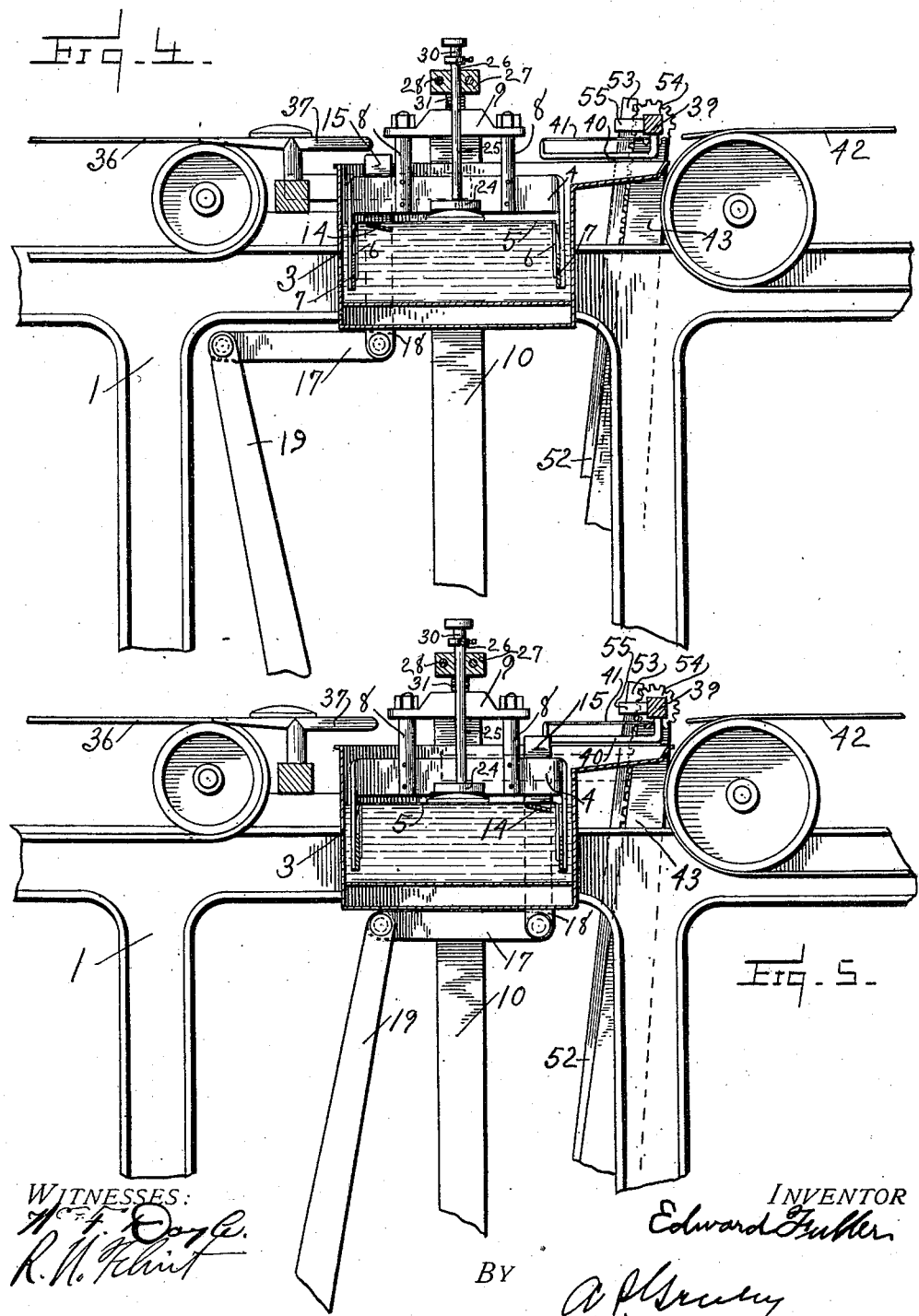

E. FULLER.
MACHINE FOR COATING CAKES.
APPLICATION FILED JULY 15, 1910.
996,479.
Patented June 27, 1911.
5 SHEETS—SHEET 5.
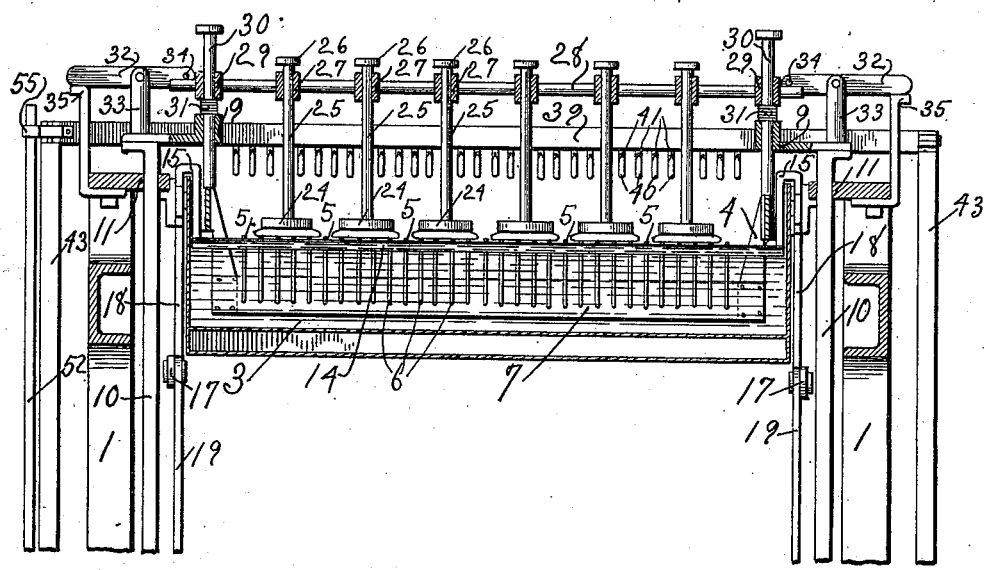
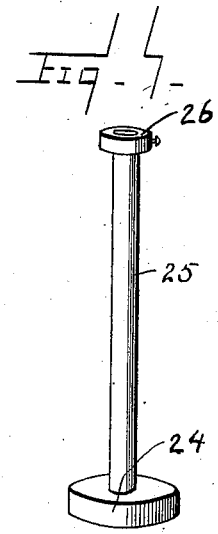
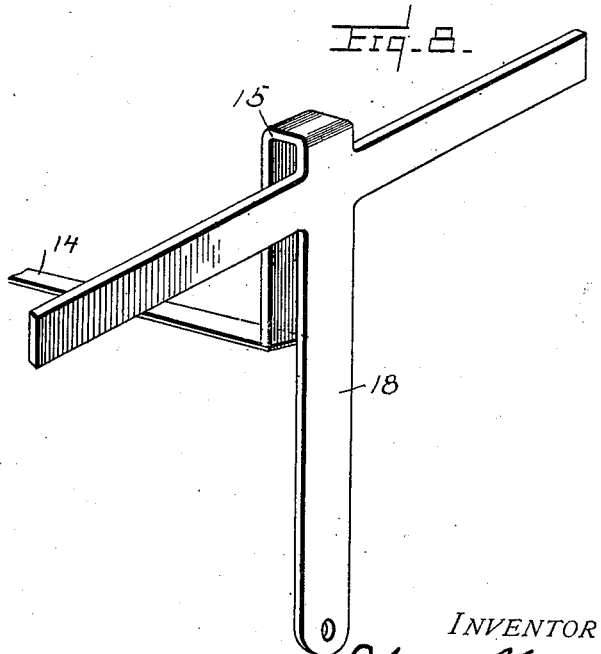
WITNESSES:
INVENTOR
Edward Fuller
BY
Attorney

UNITED STATES PATENT OFFICE.

EDWARD FULLER, OF BALTIMORE, MARYLAND.

MACHINE FOR COATING CAKES.

996,479.  Specification of Letters Patent. Patented June 27, 1911.

Application filed July 15, 1910. Serial No. 572,196.

*To all whom it may concern:*

Be it known that I, EDWARD FULLER, a citizen of the United States, residing at Baltimore, in the county of Baltimore, State of Maryland, have invented certain new and useful Improvements in Machines for Coating Cakes, of which the following is a description, reference being had to the accompanying drawings, forming a part hereof.

My invention relates to cake coating machines designed to apply a coating of sugar, chocolate or like material in a liquid form to one of the surfaces of cakes, cookies, or similar comparatively small articles of food, and the object thereof is to provide a machine for the purpose stated which will effectively apply a coating to the under side of the article to be coated and which coating will be evenly and uniformly distributed over the entire surface to be coated; to provide a machine for the purpose stated which will be of large capacity and one which will be simple in construction and reliable in operation; and to provide such further improvements in and relating to coating machines of the class referred to as are described in the following specification, illustrated in the accompanying drawings, and particularly claimed in the clauses of the concluding claim.

In the drawings: Figure 1 is a view showing that portion of a coating machine to which my invention relates, the view being taken upon vertical planes extending longitudinally of the machine and indicated by the line 1—1, Fig. 2, and looking toward the left; Fig. 2 is a view showing a section taken upon vertical planes extending transverse to the machine and indicated by the line 2—2, Fig. 1, and looking toward the right; Fig. 3 is a view showing the principal parts of my improved machine in perspective; Figs. 4 and 5 are fragmentary views serving to illustrate certain features of operation of my machine, certain of the parts being shown in two different positions in these views; Fig. 6 is a view similar to Fig. 2 but in which certain of the parts are shown in a different position and other parts are omitted, being already sufficiently illustrated in other figures, and Figs. 7 and 8 are views showing details of certain parts of my machine.

In the drawings, 1 is a part of the frame of the machine and 2 is a main operating shaft driven from any suitable source of power and having cams for operating the various parts of the machine in proper sequence.

3 is a tank for containing the liquid coating material with which the articles are to be coated, and 4 is a reciprocating carrier adapted to receive the articles to be coated and to lower them into a position such that they may be coated by the material in the tank 3, which position will be about the level of the liquid coating material although the articles may be slightly above or submerged to a slight degree in the coating material without affecting the operation of the parts or changing their ultimate operation in carrying out the coating process.

The reciprocating carrier 4 has a series of wires 5 upon which the articles to be coated rest, the said wires passing over supports 6 and being secured at their ends to side members 7 of the carrier, and said carrier has upwardly extending rods 8 engaging with yokes 9 which in turn are secured to the upper ends of vertically reciprocating operating bars 10 guided in their movements by means of guides 11. Motion is communicated to the bars 10 and, consequently, to the carrier 4, by means of cams 12 upon the main shaft 2, said cams engaging rollers 13 upon the operating bars. The length of the carrier 4 transverse to the machine is less than the corresponding dimension of the tank 3, as shown in Fig. 2, so that the carrier may pass down into the tank, and the cams 12 are so designed that when the carrier is in its lowest position the wires 5 and, consequently, the articles to be coated will be in a plane corresponding approximately with the surface of the liquid in the tank, although they may be slightly above or below such position. The carrier rises to an upper position determined by the design and construction of certain feeding mechanism for supplying articles to be coated thereto, said carrier being shown in its upper position in Figs. 1 and 2.

14 is a reciprocating spreader located within the tank 3 beneath the wires 5 of the carrier, and close to the surface of the liquid in the tank, the ends of which spreader are connected with yokes 15 at either end of the tank, which yokes are guided by guides 16 secured to the frame of the machine. Motion is transmitted to the yokes and consequently to the spreader through links 17, one end of each of which is connected with an arm 18 depending from each yoke while the other ends are connected with the upper ends of arms 19 secured to an oscillating shaft 20, which shaft is oscillated by means of an arm 21 secured thereto and having a roller 22 at its free end which roller is engaged by a cam 23 upon the main driving shaft 2, by means of which mechanism it will be understood that the spreader moves in a plane parallel with and adjacent the surface of the coating liquid in the tank 3, in the embodiment of my invention illustrated.

The cams are so designed and set upon the shaft 2 that, referring to Fig. 1, the cam 12 first permits the carrier to move downward from the position shown so as to bring the wires 5 and articles to be coated into about the level of the surface of the coating material in the tank 3, after which the cam 23 through the connections aforesaid moves the spreader to the right and across the lower surfaces of the articles to be coated, the result being that a smooth and evenly distributed coating of the material will be applied to the under surface of the articles to be coated.

As is well known the lower surfaces of small cakes, cookies, etc., are likely to have irregular depressions due to the fact that the batter from which they are made is forced away from portions of the hot baking surface during the baking process, because, probably, of the formation of gases between the batter and the heated surface; and, if cakes with such depressions are simply brought into contact with or dipped into a coating substance the depressions will contain air which will prevent the coating material from coming into contact with the bottoms of the depressions the result being that the higher portions only of the cake are coated. With my device, however, the coating material is wiped or spread across the lower surface of the articles to be coated as the spreader moves laterally beneath them, the result being that the coating material reaches every part of the surface to be coated and the coating is applied to the bottoms of the depressions as well as to the higher portions of the surfaces.

As above pointed out the bottoms of the articles to be coated may be either just at the surface of the liquid coating material in the tank, or slightly above or below it. If the bottoms of the articles are slightly above the surface of the liquid the spreader in moving throws up a slight wave which sweeps across the surface to be coated, while if the surface of the articles to be coated coincide with or is slightly beneath the surface of the coating material the spreader acts more as an element to smooth out and distribute evenly the coating material in contact with the surface to be coated, the result in either case being a smooth and uniformly distributed coating covering the entire lower surface of the article.

I prefer to use in connection with the reciprocating spreader above described, especially if the articles to be coated are small, means for engaging the articles and holding them in contact with the wires 5 while the spreader is moving beneath them. The means illustrated for accomplishing the above comprise a series of disks 24 secured to the lower ends of rods 25 having collars 26 at their upper ends. The rods 25, see Fig. 3, are freely movable vertically through an opening formed in supports 27 for the rods and disks, the collar 26, however, preventing the rods from leaving their supports. The supports 27 are carried by rods 28 which pass through holes in the supports and form a supporting member for the elements 24, 25 and 27, and the rods 28 are supported at either end in cross-heads 29 movable vertically upon guides 30 projecting upwardly from the yokes 9, whereby the supporting member and the parts supported by it are guided in their vertical movements as will hereinafter appear. Springs 31 surround the guides 30 and extend between the yokes 9 and cross-heads 29, the tendency of which is to force the cross-heads upward.

The supports 27 are adjustable along the rods 28 and the number of supports and, consequently, of disks 24 will be varied according to the size of the articles to be coated, the adjustment of the parts being such that each disk 24 engages one of the articles to be coated.

32 are levers pivoted to supports 33 secured to and movable with the operating bars 10 for the reciprocating carrier, and, consequently, movable in unison with the carrier 4, the inner ends of which levers operatively engage the ends of the rods 28 for which purpose said levers are provided with cross pieces 34. The outer ends of the said levers engage fixed stops 35 secured to the frame of the machine.

Having in mind the construction last above described, and referring to Fig. 2 of the drawing, it will be seen that the carrier 4 and disks 24 move downward together until the outer ends of the levers 32 engage the fixed stops 35; whereupon and during continued downward movement of the carrier the inner ends of the said levers and, consequently, the rods 28, supports 27 and disks 24 are moved down faster than the carrier; from which it results that the disks overtake the articles to be coated and rest upon them, thus holding the articles securely to the wires 5 of the carrier. The rods 25 move freely through the supports 27 in order to permit the rods 28 and supports 27 to continue their downward movement after the disks 24 have come into engagement with the article to be coated if at such times the said rods and supports have not been moved into their lowest position. Fig. 6 shows the parts in the position which they assume at the end of the downward movement of the carrier, the articles to be coated being held against the wires ready for the coating operation to be performed by a movement of the spreader as aforesaid.

While my invention necessarily includes means for supplying articles to be coated to the carrier 4, and for removing coated articles therefrom, the particular means employed for accomplishing these two operations and illustrated in the drawings forms no part of my invention, and such means are illustrated to a considerable degree in a conventional manner. As shown in the drawings, 36 is a conveyor for supplying articles to be coated to a table 37, and 38 is a reciprocating bar for pushing the articles from the table and onto the carrier when it is in its highest position, Fig. 1. These elements will commonly be operated from the main shaft 2.

39 is a reciprocating and oscillating bar having a series of fingers 40 and wires 41, the whole being adapted to move to the left, Fig. 1, until the fingers are beneath the coated articles, to receive the articles as the carrier 4, moves downward, to move to the right with the coated articles upon the wires 41, and then to rotate through nearly 180° to carry the coated articles up and over onto the conveyer 42 and deposit them thereupon with the freshly coated surface up.

The bar 39 is supported in bearings at the upper ends of arms 43 secured to an oscillating shaft 44, which shaft has another arm 45 with a roller 46 at its free end resting upon a cam 47 upon the shaft 2, which cam imparts movement to the left and right as above explained to the said bar. Rotary motion is imparted to the bar 39 by means of a cam 48 upon the shaft 2 which acts through a roller 49 upon a lever 50 pivoted to the frame at 51 and also pivotally connected with a pitman 52. This pitman has a rack 53 at its upper end which engages with a gear 54 upon the shaft 39, from which it will be understood that the shaft 39 will be rotated in its bearings at the upper ends of the arms 43 when the pitman 52 is moved upward. The pitman is connected with one of the arms 43, so that the pitman follows the arms in their forward and return movement, by means of a guide at 55. 56 is a spring for returning the lever 50 to its original position and thus rotating the bar 39 back into the position shown after it has been operated as aforesaid.

57 is a spring for returning the arm 21 and the arms 19 to their original position after they have been moved by the cam 23 acting through the roller 22; and 58 is a spring for returning the arm 45 and arms 43 to their original position after they have been moved by the cam 47 acting through the roller 46; one end of each of these springs being connected with the arms 21 and 45 in such a way as to clear the cams 23 and 47 as through a suitable arm as shown in Fig. 2, while the other ends of these springs are connected to the frame 1 of the machine at any available point.

The level of coating material within the tank 3 is maintained substantially constant to which end an overflow pipe 57 is provided, and 58 is a supply pipe through which coating material is supplied to the tank. Other means may, however, be employed for maintaining a constant or substantially constant level of coating material in the tank, and the same forms no part of my invention.

Having thus described my invention and explained the mode of operation thereof, I claim and desire to secure by Letters Patent:

1. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable adjacent said carrier when in its lowest position; means for operating said spreader; means for supplying articles to be coated to said carrier; and means for removing the coated articles from said carrier.

2. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable in a plane adjacent the level of the coating material therein; means for operating said spreader; means for supplying articles to be coated to said carrier; and means for removing the coated articles from said carrier.

3. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable adjacent said carrier when in its lowest position; means for operating said spreader; means adapted to engage the articles to be coated to thereby hold them in position upon said carrier; means for supplying articles to be coated to said carrier; and means for removing the coated articles from said carrier.

4. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable in a plane adjacent the level of the coating material therein; means for operating said spreader; means adapted to engage the articles to be coated to thereby hold them in position upon said carrier; means for supplying articles to be coated to said carrier; and means for removing the coated articles from said carrier.

5. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable in a plane adjacent the level of the coating material therein; means for operating said spreader; holding means carried by said carrier and normally out of contact with the articles to be coated; means for operating said holding means to move it into contact with the articles to be coated; means for supplying articles to be coated to said carrier; and means for removing the coated articles from said carrier.

6. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable in a plane adjacent the level of the coating material therein; means for operating said spreader; holding means carried by said carrier and normally out of contact with the articles to be coated; means connected with and movable in unison with said carrier for operating said holding means to move it into contact with the articles to be coated; a fixed stop in position to be engaged by said holder operating means as said carrier moves downward; means for supplying articles to be coated to said carrier; and means for removing the coated articles from said carrier.

7. In a device of the class described, a tank adapted to contain a coating material; a reciprocating carrier movable vertically and adapted to receive and support articles to be coated and to lower them into a position to be coated by the material in said tank; means for operating said carrier; a reciprocating spreader located within said tank and movable in a plane adjacent the level of the coating material therein; means for operating said spreader; a supporting member extending longitudinally of said carrier and movable vertically relatively thereto; guiding means at either end of said supporting member, the same being connected with said carrier; a lever at either end of said supporting member, the fulcrum of which is connected with and moves in unison with said carrier, and the inner ends of which levers are operatively connected with the ends of said supporting member; fixed stops in position to be engaged by the outer ends of said levers as said carrier moves downward; a holding member carried by said supporting member, the same being normally out of contact with the articles to be coated but adapted to engage the same as said supporting member is moved downward; means for supplying articles to be coated to said carrier; and means for removing the coated articles from said carrier.

This specification signed and witnessed this sixth day of July A. D. 1910.

EDWARD FULLER.

In the presence of—
FELIX R. SULLIVAN,
A. V. JAVINS.

---

Copies of this patent may be obtained for five cents each, by addressing the "Commissioner of Patents, Washington, D. C."